Patented Feb. 1, 1938

2,107,197

UNITED STATES PATENT OFFICE 2,107,197

PROCESS FOR THE PREPARATION OF WETTING, EMULSIFYING, DISPERSING OR CLEANSING AGENTS AND PRODUCTS OBTAINED BY THIS PROCESS

André Butignot, Creil, France, assignor to Compagnie Nationale de Matieres Colorantes et Manufactures de Produits Chimiques du Nord Réunies, Etablissements Kuhlmann, Paris, France, a corporation of France No Drawing. Application April 24, 1935, Serial No. 18,078. In France May 2, 1934

14 Claims. (Cl. 260—127)

The preparation is known of aliphatic ketones of general formula R—CO—R' or R—CO—R, in which R represents an aliphatic chain containing more than 8 and generally between 12 and 18 carbon atoms, and R' represents a short aliphatic chain containing less than five carbon atoms. For example the ketones R—CO—$CH_3$ are obtained by the known general method consisting in passing over a catalyst a mixture of aliphatic acid and acetic acid. The ketones R—CO—R are obtained chiefly by heating a fatty acid with 10% of its weight of iron filings.

Now it has been found in accordance with the present invention that these ketones can be easily halogenated and that the halogen fixed is specially reactive and can be replaced easily by a solubilizing group or by a chain comprising such a group. The products thus obtained are wetting, emulsifying, dispersing or cleansing agents of great value.

As solubilizing groups can be selected for example either solubilizing groups of acid character such as the groups —$SO_3H$, —$OSO_3H$, —$OPO_3H_2$, in the free state or as salts, or solubilizing groups of basic character such as primary, secondary or tertiary amino groups, preferably as salts, or also solubilizing groups of neutral character such as those constituted by an assembly of hydroxyl groups or ether-oxide groups, although in this latter case the solubility obtained is probably only a colloidal solubility.

The replacement of the halogen by the solubilizing group may be made in one or more stages. It is possible for example to replace the halogen by a hydroxyl group and to sulphonate the product obtained in such a manner as to obtain a sulphuric acid ester. It is likewise possible to replace the halogen directly by a sulphonic, thiosulphate, amino, diethylamino, poly-glycerine group by treating the halogenated derivative respectively with sodium sulphite, sodium hyposulfite, ammonia, diethylamine, a sodium compound of poly-glycerine and so on.

It is also possible, as has been stated above, to replace the halogen by a chain containing a solubilizing group. This replacement can likewise be effected in one or more stages. It is possible for example to cause the halogenated derivative of the ketone to react with an organic compound containing on the one hand a group capable of reacting with the halogen of the ketone and on the other hand a solubilizing group or a group capable of being converted into such a group by subsequent reaction. As compounds of this type can be mentioned in particular aminomethane-sulphonic acid, taurine, asymetrical-dimethylethylene-diamine, ethanolamine and so on. In the case of ethanolamine the product obtained is to be sulphonated.

The following examples illustrate the invention without limiting the same thereto.

*Example 1*

There is dissolved in carbon tetrachloride one molecule of a ketone derived from the stearic acid and of the type R—CO—R where R represents an aliphatic chain saturated with about 18 carbon atoms. There is passed into this solution a current of chlorine in quantity corresponding to one molecule, then the hydrochloric acid in excess is removed and the solvent is evaporated. The chlorinated ketone is purified by crystallization in glacial acetic acid.

*Example 2*

There is dissolved in carbon-tetrachloride one molecule of a ketone derived from the fatty acid of coconut and acetic acid of the formula R—CO—$CH_3$ in which R represents an aliphatic chain of about 13 carbon atoms. Bromine is added drop by drop in quantity corresponding to one molecule, the hydrobromic acid in excess is removed and the solvent is evaporated. The brominated ketone is purified by distillation in vacuum.

*Example 3*

The product of Example 2 is heated to boiling for 3 hours with an aqueous solution containing 20% of sodium sulphite. It passes into solution and gives a soluble product having good foaming, wetting and cleansing properties.

*Example 4*

The product of Example 2 is heated gently with the theoretical quantity of alcoholic potash. A product is obtained no longer containing halogen and in which the bromine atom has been replaced by an OH group. This hydroxy-ketone can be treated with sulphuric acid or phosphoric acid according to the known methods. The products obtained have good wetting and cleansing properties.

*Example 5*

1 molecular proportion of the product of Example 2 is dissolved in benzene. 2 molecules are added of the finely ground monosodic derivative of the glycerine. There it is heated under reflux for 3-4 hours, poured into water and extracted with benzene. On evaporation of the benzenic solution there is obtained a thick oil of clear yellow colour which is the desired polyhydroxy compound. This product, esterified by known means with sulphuric acid, gives a cleansing agent of excellent properties.

*Example 6*

The product of Example 2 is heated to 120° C. with twice its weight of anhydrous aminomethane-sulphonate of sodium. There is taken up in water and the residue is extracted with benzene. After filtration of the benzenic solution, neutralization and evaporation of the benzene there is obtained the desired condensation product containing sulphur and nitrogen.

*Example 7*

The product of Example 2 is dissolved in benzene. A current of gaseous ammonia is passed through at ordinary temperature. There is filtered in order to separate the ammonium bromide which is recovered in practically theoretical quantity. The benzenic solution evaporated to dryness gives the desired nitrogen compound.

*Example 8*

1 molecule of the product of Example 1 is treated at boiling temperature with 1 molecule of alcoholic potash. The hydroxy derivative obtained is crystallized in acetic acid, then esterified with sulphuric acid.

What I claim is:

1. The process for the preparation of wetting, emulsifying, dispersing or cleansing agents consisting in monohalogenating aliphatic ketones of the general formula $R-CO-CH_3$, in which R represents an aliphatic chain containing from 8 to 18 atoms of carbon, and condensing the halogenated ketone thus obtained with an alkali metal sulphite.

2. The process for the preparation of wetting, emulsifying, dispersing or cleansing agents consisting in monohalogenating aliphatic ketones of the general formula $R-CO-CH_3$, in which R represents an aliphatic chain containing from 8 to 18 atoms of carbon, and condensing the halogenated ketone thus obtained with an alkali metal compound.

3. The process for the preparation of wetting, emulsifying, dispersing or cleansing agents consisting in monohalogenating aliphatic ketones of the general formula $R-CO-CH_3$, in which R represents an aliphatic chain containing from 8 to 18 atoms of carbon and condensing the halogenated ketone thus obtained with diethylamine.

4. The wetting, emulsifying, dispersing and cleansing agents obtained by the action of an alkali metal compound of glycerine on monohalogenated aliphatic ketones of the general formula $R-CO-CH_3$, in which R represents an aliphatic chain which contains from 8 to 18 atoms of carbon.

5. The wetting, emulsifying, dispersing and cleansing agents obtained by the action of diethylamine on monohalogenated aliphatic ketones of the general formula $R-CO-CH_3$, in which R represents an aliphatic chain which contains from 8 to 18 atoms of carbon.

6. The wetting, emulsifying, dispersing and cleansing agents obtained by the introduction of a sulphonic group, in place of the halogen, on monohalogenated aliphatic ketones of the general formula $R-CO-CH_3$ in which R represents an aliphatic chain which contains from 8 to 18 atoms of carbon.

7. A process for the preparation of wetting, emulsifying, dispersing or cleansing agents, consisting in monohalogenating aliphatic ketones of the general formula $R-CO-CH_3$, in which R represents an aliphatic chain containing from 6 to 18 atoms of carbon and in condensing the halogenated ketones thus obtained with agents containing a solubilizing group and a reactive hydrogen.

8. A process for the preparation of wetting, emulsifying, dispersing or cleansing agents, consisting in monohalogenating aliphatic ketones of the general formula $R-CO-CH_3$, in which R represents an aliphatic chain containing from 6 to 18 atoms of carbon and in condensing the halogenated ketones thus obtained with agents containing a solubilizing group and an alkali metal which replaces a reactive hydrogen.

9. A process for the preparation of wetting, emulsifying, dispersing or cleansing agents, consisting in monohalogenating ketone mixtures resulting from the fatty acids of cocoanut oil mixed with acetic acid, and in condensing the halogenated ketones thus obtained with agents containing a solubilizing group and a reactive hydrogen.

10. A process for the preparation of wetting, emulsifying, dispersing or cleansing agents, consisting in monohalogenating ketone mixtures resulting from the fatty acids of cocoanut oil mixed with acetic acid, and in condensing the halogenated ketones thus obtained with agents containing a solubilizing group and an alkali metal which replaces a reactive hydrogen.

11. The wetting, emulsifying, dispersing and cleansing agents obtained by the process claimed in claim 7.

12. The wetting, emulsifying, dispersing and cleansing agents obtained by the process claimed in claim 8.

13. The wetting, emulsifying, dispersing and cleansing agents obtained by the process claimed in claim 9.

14. The wetting, emulsifying, dispersing and cleansing agents obtained by the process claimed in claim 10.

ANDRÉ BUTIGNOT.